United States Patent [19]

Wang

[11] Patent Number: 5,939,464
[45] Date of Patent: Aug. 17, 1999

[54] HIGH ELASTICITY FOAMS

[75] Inventor: Donald S. T. Wang, Akron, Ohio

[73] Assignee: Advanced Elastomer Systems, L.P., Akron, Ohio

[21] Appl. No.: 08/848,992

[22] Filed: May 2, 1997

[51] Int. Cl.$^6$ ....................................................... C08J 9/00
[52] U.S. Cl. .............................. 521/139; 521/81; 521/140
[58] Field of Search ................................. 521/139, 140, 521/81

[56] References Cited

U.S. PATENT DOCUMENTS

| | | | |
|---|---|---|---|
| 4,020,025 | 4/1977 | Zeitler et al. | 260/2.5 |
| 4,130,534 | 12/1978 | Coran et al. | 260/33.6 |
| 4,212,787 | 7/1980 | Matsuda et al. | 521/134 |
| 4,311,628 | 1/1982 | Abdou-Sabet et al. | 260/33.6 |
| 4,677,133 | 6/1987 | Leicht | 521/51 |
| 4,745,149 | 5/1988 | Eisele et al. | 524/505 |
| 4,889,888 | 12/1989 | Bassi et al. | 525/75 |
| 4,906,683 | 3/1990 | Komatsu et al. | 524/528 |
| 5,070,111 | 12/1991 | Dumbauld | 521/82 |
| 5,073,597 | 12/1991 | Puydak et al. | 525/193 |
| 5,114,987 | 5/1992 | Cakmak et al. | 521/140 |
| 5,317,035 | 5/1994 | Jacoby et al. | 521/143 |
| 5,393,796 | 2/1995 | Halberstadt et al. | 521/140 |

FOREIGN PATENT DOCUMENTS

WO 95/04775  2/1995  WIPO .

OTHER PUBLICATIONS

Japanese Publication No. 1,024,839, published on Jan. 26, 1989, in English (Abstract only).

*Primary Examiner*—Morton Foelak
*Attorney, Agent, or Firm*—Samuel B. Laferty; William A. Skinner

[57] ABSTRACT

High elasticity foams can be prepared from a reprocessable blend of a thermoplastic vulcanizate and an elastic thermoplastic polymer. These foams can be mechanically foamed with water and can have elongations to break in excess of 250 percent. They also have recovery of that elongation also known as low permanent set.

18 Claims, No Drawings

HIGH ELASTICITY FOAMS

FIELD OF INVENTION

High elasticity foams are prepared by blending a thermoplastic vulcanizate (TPV) with an elastic thermoplastic. The resulting blend can be chemically or mechanically foamed. The foams have high elongation to break (e.g. 250–500% or more) and when the extending force is withdrawn, they retract to approximately their original dimensions.

BACKGROUND OF THE INVENTION

Thermoplastic elastomers (thermoplastic vulcanizates) have been foamed both chemically and mechanically as disclosed in U.S. Pat. No. 5,070,111. A preferred mechanical foaming agent is water due to its low toxicity. These foams can have elongations to break up to about 200%.

Elastic thermoplastics can be chemically foamed but are not readily foamed mechanically such as with water.

Thermoplastic elastomers have been modified with random or block styrene copolymers as disclosed in U.S. Pat. No. 4,906,683.

Polyurethane foams have been popular due to the ability to make both rigid foams and elastic foams by changing the chemical composition of the urethane polymers. Although there may be some exceptions, generally urethane foams are not reprocessable.

SUMMARY OF THE INVENTION

Blends of thermoplastic vulcanizates (TPV) and elastic thermoplastic polymers can be either chemically or mechanically foamed into reprocessable compositions that have high elongation (e.g. in excess of 250 or 500% or more elongation to break). These compositions also have elastic memory—as more than 60 to 90% of the samples' deformation can be recovered by the retraction forces in the composition. A recovery of 90% or more means the permanent set is less than 10% as the values are complementary. Typically approximately original length recovery occurs (within a minute) at 25±2° C. Although the elongation rate can vary the values reported are based on tensile elongation at about 20 inches per minute based on a jaw separation of 2 inches.

The foamed compositions can have densities of less than 0.75 g/cc or 0.60 g/cc, more desirably from 0.05 to 0.60, and preferably from about 0.05 to about 0.40 g/cc. Depending on the composition and the foaming details both open cell and/or closed cell foam can be produced. The skin of the foamed articles can be smooth or rough.

The elastic thermoplastic polymer can be block copolymer of hard and soft segments. They are not thermoplastic vulcanizates. At the use temperature the hard segments can aggregate and act as physical crosslinks. The soft segments provide deformability. Examples include styrene or other vinyl aromatic monomers as the hard segments and a rubbery block as the soft segment such as polydiene rubber or a hydrogenated diene rubber. These block copolymers typically have greater than 90% recovery of their elongation on the second or third stretch in the elasticity test.

The elastic thermoplastic polymer can also be other polymers from two or more monomers such as ethylene-vinyl acetate, ethylene-methyl acrylate, ethylene-styrene, or ethylene-butyl acrylate copolymer, etc. These type of polymers can have more permanent set, e.g., less than about 30 or 40% in the elasticity test (e.g., recovery of about 60 or more or 70% or more).

The elastic thermoplastic polymers vary from other thermoplastics by having a tensile elongation to break of at least 200% at 25° C.

DETAILED DESCRIPTION OF THE INVENTION

A high elasticity foam has been developed from a blend of a thermoplastic vulcanizate and an elastic thermoplastic polymer. These foams differ from the prior art foams from thermoplastic vulcanizates in that they have elongations to break in excess of 250% and into the range of 500% elongation or more. Generally, unmodified thermoplastic vulcanizates have elongations to break of less than 250%. These blends can be mechanically foamed. An advantage of mechanically formed foams over chemically formed foams is that they can be mechanically foamed with non-reactive relatively benign mechanical foaming agents such as water. These mechanically foamed foams have less tendency to result in contact dermatitis.

An elastic thermoplastic polymer has the properties of a thermoplastic (e.g it is reprocessable without cleaving chemical bonds) and an elastomer (e.g. it is extensible to several hundred percent elongation with recovery of approximately the initial length after the extending force is removed). Elastic thermoplastic polymers as used herein are generally not chemically crosslinked but may have one or more phases that acts as a physical crosslink below a certain use temperature. This allows the elastic thermoplastic polymers to be melt processed (deformed and shaped) above the use temperature and then act as a crosslinked material (retracting to predefined size and shape) at the use temperature or below the use temperature. An elastic thermoplastic polymer can be a thermoplastic block copolymer elastomer or can be a thermoplastic polymer that has some elastic characteristics. Examples of elastic thermoplastic polymers include styrene block copolymers with rubbery blocks, ethylene-vinyl acetate copolymers, ethylene-styrene copolymers, ethylene-methyl acrylate copolymers and ethylene-butyl acrylate copolymers.

The elastic thermoplastic polymers of this invention generally will have elongations to break in excess of 200% at an elongation rate of 20 inches per minute at 25° C. They will also have approximate recovery of their initial length following the elongation. More preferred elastic thermoplastic polymers will have elongations of at least 350% and still more preferably greater than or equal to 500%. They will desirably have recovery of that elongation. Desirably that recovery according to the elastic recovery test or the elasticity test will be in excess of 60% and more desirably in excess of 70, 80 or 90%.

The elastic thermoplastic polymer of the blend of the thermoplastic vulcanizate and the elastic thermoplastic polymer can be any elastic thermoplastic, but excludes thermoplastic vulcanizates. The thermoplastic elastomer polymer will desirably have at least about 2 blocks of thermoplastic polymer such as derived from a vinyl aromatic monomer having from 8 to 15 carbon atoms such as styrene, paramethylstyrene, and alphamethyl-styrene, or other thermoplastic polymers such as methyl-methacrylate etc. These thermoplastic polymer blocks could act as physical crosslinks at temperatures below their melting temperature. Melting temperature will be defined as the temperature above which the polymer softens enough to be extrudable and injection moldable. Between the thermoplastic blocks are desirably one or more blocks of an elastomeric polymer that is extensible at temperatures above their glass transition temperature. The glass transition temperature of elastomeric polymers are generally below and desirably well below 25° C. The elastomeric or rubbery polymer can be any rubbery polymer that can be functionalized with said hard segments to form block copolymers. The preferred rubbery blocks are polybutadiene; polyisoprene; poly(styrene-butadiene); poly (isobutylene); ethylene-propylene; or hydrogenated (partially preferred) versions of the above polymers from conjugated dienes. The preferred rubbery polymers from conjugated dienes have from about 50 to about 100 weight percent repeat units from one or more conjugated dienes having from 4 to 8 carbon atoms. Optionally, these polymers can include repeat units from a vinyl aromatic monomer(s) having from 8 to 12 carbon atoms.

The elastic thermoplastic polymer can also be other polymers from two or more monomers such as ethylene-vinyl acetate, ethylene-methyl acrylate, ethylene-styrene, or ethylene-butyl acrylate copolymer, etc. These type of polymers will be described as polymers desirably having at least 40 wt. % of repeat units from ethylene. They are often called reactor copolymers or polymers from metallocene catalyst. Preferred are ethylene based copolymers. These type of polymers can have more permanent set, e.g., less than about 30 or 40% in the elasticity test (e.g., recovery of about 60 or more or 70% or more).

A thermoplastic vulcanizate (TPV) is generally defined as a reprocessable material that has at least one partially or fully crosslinked rubbery component. It typically also has a thermoplastic component which makes it reprocessable. Typically the thermoplastic phase may be a polyolefin, polyamide, polyester, or polyurethane that is reprocessable at a temperature above its melt temperature.

The term thermoplastic vulcanizate is used herein to mean a mixture ranging from small particles of crosslinked rubber well dispersed in the thermoplastic matrix to co-continuous phases of the crystalline polymer, e.g. polyolefin, and a partially to fully crosslinked rubber, or combinations thereof. The term thermoplastic vulcanizate is limited to where the rubber phase is at least partially vulcanized (crosslinked). A thermoplastic vulcanizate possesses the properties of a thermoset elastomer and is reprocessable in an internal mixer. Upon reaching temperatures above the softening point or melting point of the plastic phase they can form continuous sheets and/or molded articles with complete knitting or fusion of the thermoplastic vulcanizate under conventional molding or shaping conditions for thermoplastics.

In embodiments where the rubber phase of the thermoplastic vulcanizate is to be fully crosslinked, desirably less than 3 wt. % and more desirably less than 1 wt. % of the crosslinkable rubber is extractable from the specimen of the thermoplastic vulcanizate in boiling xylene following dynamic vulcanization. Techniques for determining extractable rubber as set forth in U.S. Pat. No. 4,311,628 are herein incorporated by reference.

The plastic component portion of the thermoplastic vulcanizate may be a crystalline polyolefin, a co-polyamide, a copolyester, or a thermoplastic polyurethane. The crystalline polyolefin comprises crystalline thermoplastic polymers from the polymerization of monoolefin monomers by a high pressure, low pressure or intermediate pressure process; or by Ziegler Natta catalysts or by metallocene catalysts. Desirably the monoolefin monomers converted to repeat units are at least 95 wt. % monoolefins of the formula $CH_2=C(CH_3)-R$ or $CH_2=CHR$ where R is a H or a linear or branched alkyl group of from 1 to 12 carbon atoms.

Preferred crystalline polyolefins are polyethylene and polypropylene or their copolymers and mixtures thereof. The polyethylene can be high density, low density, linear low density, or very low density. The polypropylene can be a homopolymer as well as a reactor copolymer polypropylene. Generally the higher the melting temperature of the plastic phase the higher the potential use temperature of the thermoplastic vulcanizate.

The plastic of the thermoplastic vulcanizate is desirably from about 15 to about 80 parts by weight, more desirably from about 25 to about 75 parts by weight, and preferably from about 25 to about 50 parts by weight per 100 parts of the blend of plastic and the crosslinkable rubber in the thermoplastic vulcanizate. The crosslinkable rubber is desirably from about 20 to about 85 parts by weight, more desirably from about 25 to about 75 parts by weight and preferably from about 50 to about 75 parts by weight per 100 parts by weight of said blend in the thermoplastic vulcanizate. If the amount of plastic is based on the amount of crosslinkable rubber, it is desirably from about 15 to about 400 parts by weight, more desirably from about 30 to about 350 parts and preferably from about 35 to about 300 parts by weight per 100 parts by weight of the crosslinkable rubber.

The crosslinkable rubber can be any rubber having residual unsaturation or curable functional sites that can react and be crosslinked with curing agents under conventional crosslinking conditions. Examples of crosslinking agents include sulfurs, phenolic resin, peroxides, diamines, phenylenedimaleimide, hydrosilation agent, etc. The rubbers can include natural rubber, EPDM rubber, butyl rubber, halobutyl rubber, halogenated copolymers of isobutylene and para-methylstyrene (e.g. Exxpro™ Br-XP-50), synthetic rubbers from at least one conjugated diene having from 4 to 10 carbon atoms, or partially hydrogenated synthetic rubbers or combinations thereof. Also included are rubbers comprising at least one alpha-olefin, at least one vinylidene aromatic compound, and at least one diene. EPDM, butyl, and halobutyl rubbers are referred to as rubbers low in residual unsaturation and are preferred when the vulcanizate needs good thermal stability or oxidative stability. The rubbers low in residual unsaturation desirably have less than 10 wt. % repeat units having unsaturation. For the purpose of this invention copolymers will be used to define polymers from two or more monomers and polymers can have repeat units from 1 or more different monomers.

The rubber is desirably an olefin rubber such as EPDM type rubber. EPDM type rubbers are generally terpolymers derived from the polymerization of at least two monoolefin monomers having from 2 to 10 carbon atoms, preferably 2 to 4 carbon atoms, and at least one poly-unsaturated olefin having from 5 to 20 carbon atoms. Said monoolefins desirably have the formula $CH_2=CH-R$ where R is a H or an alkyl of 1–12 carbon atoms and are preferably ethylene and propylene. Desirably the ethylene and propylene are present in the polymer in weight ratios of 5:95 to 95:5 (ethylene/propylene) and constitute from about 90 to about 99.6 wt. % of the polymer. The polyunsaturated olefin can be a straight chained, branched, cyclic, bridged ring, bicyclic, fused ring bicyclic compound, etc., such as 1,4-hexadiene, dicyclopentadiene, and ethylidene norbornene. Preferably it is a nonconjugated diene. Desirably repeat units from the non-conjugated polyunsaturated olefin is from about 0.4 to about 10 wt. % of the rubber.

The rubber can be a butyl rubber. Butyl rubber is defined a polymer predominantly comprised of repeat units from isobutylene but including a few repeat units of a monomer which provides sites for crosslinking. The monomers which provide sites for crosslinking can be a polyunsaturated monomer such as a conjugated diene or divinyl benzene or it can be paramethylstyrene which is brominated after being polymerized. Desirably from about 90 to about 99.5 wt. % of the butyl rubber is repeat units derived from the polymerization of isobutylene and from about 0.5 to about 10 wt. % of the repeat units are from a polyunsaturated monomer having from 4 to 12 carbon atoms. Alternatively, the polymer may include from about 85 to about 99.5 wt. % repeat units from isobutylene and from about 0.5 to about 15 wt. % repeat units from paramethylstyrene. Desirably such a copolymer is halogenated such as brominated. Preferably the polyunsaturated monomer is isoprene or divinylbenzene. The polymer may be halogenated to further enhance reactivity in crosslinking. Preferably the halogen is present in amounts from about 0.1 to about 10 wt. %, more preferably about 0.5 to about 3.0 wt. % and preferably the halogen is chlorine or bromine.

Other rubber such as natural rubber or a synthetic rubber from at least one conjugated diene can be used in the dynamic vulcanizate. These rubbers are higher in unsaturation than EPDM rubber and butyl rubber. The natural rubber and synthetic rubber can optionally be partially hydrogenated to increase thermal and oxidative stability. The synthetic rubber can be nonpolar or polar depending on the comonomers. Desirably the synthetic rubber has at least repeat units from at least one conjugated diene monomer having from 4 to 8 carbon atoms. Comonomers may be used and include vinyl aromatic monomer(s) having from 8 to 12 carbon atoms and acrylonitrile or alkyl substituted acrylonitrile monomer(s) having from 3 to 8 carbon atoms. Other comonomers desirably used include repeat units from monomers having unsaturated carboxylic acids, unsaturated dicarboxylic acids, unsaturated anhydrides of dicarboxylic acids and other monomers having from 3 to 20 carbon atoms. Examples of synthetic rubbers include synthetic polyisoprene, polybutadiene rubber, styrene-butadiene rubber, butadiene-acrylonitrile rubber etc. Amine functionalized or epoxy functionalized synthetic rubbers may be used. Examples of these include amine functionalized EPDM, and epoxy functionalized natural rubbers. These materials are commercially available.

The thermoplastic vulcanizates of this disclosure are generally prepared by melt mixing the crystalline polymer (e.g. polyolefin), the unsaturated rubber, and other ingredients (filler, plasticizer lubricant, stabilizer, etc.) in a mixer heated to above the melting temperature of the crystalline polymer (e.g. polyolefin). The optional fillers, plasticizers, additives etc. can be added at this stage or later. After sufficient molten-state mixing to form a well mixed blend, vulcanizing agents (also known as curatives or crosslinkers) are generally added. It is convenient to follow the progress of vulcanization by monitoring mixing torque or mixing energy requirements during mixing. The mixing torque or mixing energy curve generally goes through a maximum after which mixing can be continued somewhat longer to improve the fabricability of the blend. If desired, one can add some of the ingredients after the dynamic vulcanization is complete. After discharge from the mixer, the blend containing vulcanized rubber and the thermoplastic can be milled, chopped, extruded, pelletized, injection molded, or processed by any other desirable technique. It is usually desirable to allow the fillers and a portion of any plasticizer to distribute themselves in the rubber or crystalline polyolefin phase before the rubber phase or phases are crosslinked. Crosslinking (vulcanization) of the rubber can occur in a few minutes or less depending on the mix temperature, shear rate, activators and curatives. Suitable curing temperatures include from about 120° C. for a crystalline polyethylene or 175° C. for a crystalline polypropylene phase to about 250° C., more preferred temperatures are from about 150 or 170 to about 200 or 225° C. The mixing equipment can include Banbury™ mixers, Brabender™ mixers and certain mixing extruders.

The thermoplastic vulcanizate or the blend of the thermoplastic vulcanizate and the elastic thermoplastic polymer having a capacity for retractable 200% or more elongation can include a variety of additives. The additives include particulate fillers such as carbon black, silica, or titanium dioxide, colored pigments, clay, zinc oxide, stearic acid, stabilizers, antidegradants, flame retardants, processing aids, adhesives, tackifiers, plasticizers, wax, discontinuous fibers (such as wood cellulose fibers) and extender oils. When extender oil is used it can be present in amounts from about 5 to about 300 parts by weight per 100 parts by weight of the blend of crystalline polymer (e.g. polyolefin) and crosslinkable rubber in the thermoplastic vulcanizate. The amount of extender oil (e.g. hydrocarbon oils and ester plasticizers) may also be expressed as from about 30 to 250 parts, more desirably from about 70 to 200 parts by weight per 100 parts by weight of said crosslinkable rubber. When non-black fillers are used it is desirable to include a coupling agent to compatibilize the interface between the non-black fillers and polymers. Desirable amount of carbon black, when present, is from about 40 to about 250 parts by weight per 100 parts by weight of crosslinkable rubber of said thermoplastic vulcanizate and from about 10 to about 100 parts by weight per 100 total parts by weight total of said crosslinkable rubber and said extender oil.

The foamed blends of thermoplastic vulcanizate and elastic thermoplastic of the invention are useful for making a variety of articles such as waist bands, belts, gaskets, moldings and molded parts. They are particularly useful for making articles by extrusion. Injection molding and compression molding techniques could be used to form articles but the foaming action would have to be controlled appropriately to ensure product uniformity.

The stress-strain properties of the polymers or blends [thermoplastic vulcanizate (TPV), elastic thermoplastic polymer, blend of TPV and elastic thermoplastic polymer, and foamed blend of TPV and elastic thermoplastic polymer] are determined in accordance with the test procedures set forth in ASTM D412. These properties include tension set (TS), ultimate tensile strength (UTS), 100% modulus (M100), 300% modulus (M300), and ultimate elongation at break (UE). The elastic recovery test involves elongating the sample, to 100% elongation, holding at 100% elongation for 10 minutes, and then releasing the tension and measuring as tension set the increase in length over its original length after resting and retracting for 10 minutes. One hundred minus the tension set is the elastic recovery. The elasticity test varies from the elastic recovery test. The elasticity test measures the stress and the strain with time as the sample is stretched to 150% elongation (rate 20 inches/min. based on a 2 inch jaw separation), held at 150% elongation for 30 seconds, and allowed to retract by removing the tension and allowing a 1 minute relaxation time. The percent set in the elasticity test is the difference in the sample length after the second stretch and the sample length after the 1st stretch divided by the length after the 1st stretch. The percent recovery in the elasticity test is 100 minus the % set.

Thermoplastic elastomers have been foamed using chemical blowing agents, low-boiling hydrocarbons, or chlorofluorocarbons as foaming agents. These have drawbacks, based on environmental considerations. Although the chlorofluorocarbons have been widely and effectively used in foaming thermoplastic elastomers, their perceived threat to the ozone layer has prompted a search for alternative foaming methods which do not possess environmental hazards or present any of the other drawbacks. Other foaming agents include isobutane, azodicarbonamides, sodium bicarbonate, sodium carbonate, etc. The process for using chemical blowing agents is explained in trade literature from companies such as Ready International Corp. in Keyport, N.J.

It has been found that thermoplastic vulcanizates can be foamed by heating them to above their melting point, admixing with a minor amount of water under pressure, and then releasing the mixture to atmospheric pressure. Excellent foaming can be accomplished with water as the sole foaming agent.

The thermoplastic elastomer composition is heated to a temperature above the melting point of the plastic. This step allows the composition to be handled and conveyed, as in an extruder, and also permits the admixture with the foaming agent, which is preferably water in one embodiment of the process of the invention. When using water, generally from 0.1 to 10 weight percent of water is added in this step, it is intimately mixed with the composition. It has been found that less than 0.1 weight percent of water produces such a small degree of foaming that it can be considered ineffective in the process. On the other hand, amounts of water in excess of 10 weight percent produce an unusable product which is insufficiently strong to be of any practical value. The desired amount of water can be easily calculated, based on the desired density of the finished foam, and verified with a minimum of experimentation. It will usually be desired to achieve a density reduction of from 10% to 70%, based on the density of the starting composition; this result can be accomplished within the water addition levels described above. The water can be admixed by itself or it can be added in combination with minor amounts of detergents, surfactants, or a glycol, such as ethylene glycol. No other foaming agents need to be used in the process.

The water foaming process lends itself especially well to continuous operation, using a mixing extruder. Although it could be performed in a batch mode, continuous production is greatly preferred.

Since the composition is at a temperature above the melting point of the plastic (typically substantially above 100° C.) when the water is added, pressure is required on the mixture so as to keep the water in its liquid stage. Depending on the actual temperature employed, the required pressure can be easily calculated, and is normally not excessive. At temperatures of from about 100° to about 250° C., this level of pressure can be accomplished with typical mixing extruders.

When the water has been admixed to the composition, the process is completed by releasing the mixture of the composition and the water to atmospheric pressure. This step can be, and usually will be combined with a shaping operation, as by extruding the mixture through a shaping die so as to form it into a profile. In this way, a strip of foamed thermoplastic elastomer is produced which can find use as a gasket or sealing strip. Alternatively, the mixture can be injected into a mold to produce a foamed thermoplastic part.

More detailed and specific instructions for water foaming are given in the examples of U.S. Pat. No. 5,070,111 hereby incorporated by reference.

EXAMPLES

TABLE I

Foam Properties from Thermoplastic Vulcanizates or Elastic Thermoplastic Polymers.

| Material | Specific Gravity | Percent Elongation at Break | Elastic Recovery Test. % Set (Tension) | Water Foaming Ability |
|---|---|---|---|---|
| Santoprene ® (EPDM-Polyolefin Thermoplastic Vulcanizate) Shore A 65 | <0.3 | <200 | 10 | Excellent |
| Trefsin ® (Butyl Rubber-Polyolefin Thermoplastic Vulcanizate) Shore A 65 | <0.3 | <200 | 15 | Excellent |
| SIS (Styrene-Isoprene Styrene Triblock Copolymer) | ~0.8 | >1000 | <5 | Non-foamable with Water |
| SBS (Styrene Butadiene Styrene Triblock Copolymer | ~0.8 | >1000 | <5 | Non-foamable with Water |
| SEBS (Styrene-Ethylene-Butylene Styrene Triblock Copolymer) | ~0.8 | <700 | <5 | Non-foamable with Water |
| SEPS (Styrene-Ethylene Propylene-Styrene Triblock Copolymer) | ~0.8 | <700 | <5 | Non-foamable with Water |
| EVA (Ethylene-Vinylacetate with approximately 15 wt. % vinylacetate | ~0.8 | <800 | <15 | Non-foamable with Water |
| EMA (Ethylene Methylacrylate Copolymer) approx. 20 wt. % MA and 80 wt. % E. | ~0.8 | <1000 | <10 | Non-foamable with Water |

Table I illustrates that thermoplastic vulcanizates (TPV) have excellent water foaming characteristics. However, they tend to have low elongations to break and relatively high percentages of set in the elastic recovery test. A high amount of set precludes applications requiring dimensional stability after repeated elongations. The elastic thermoplastic materials are generally non-foamable with water but have high elongations to break and relatively lower amounts of set after elongation.

TABLE II

Blends of Thermoplastic Vulcanizates With an Elastic Thermoplastic Polymer

| Material | Specific Gravity | Percent Elongation at Break | Percent Set | Water Foaming Ability |
|---|---|---|---|---|
| SIS/Santoprene ® | 0.6 | 800 | <10 | Good |
| SIS/Trefsin ® | 0.6 | 800 | <10 | Good |
| SBS/DVA's Shore A 65 | 0.4 | 400 | <10 | Difficult |
| SEBS or SEPS/Santoprene | 0.6 | <400 | <10 | Marginal |

TABLE II-continued

Blends of Thermoplastic Vulcanizates With an Elastic Thermoplastic Polymer

| Material | Specific Gravity | Percent Elongation at Break | Percent Set | Water Foaming Ability |
|---|---|---|---|---|
| EVA/Santoprene | 0.6 | 700 | >10 | Acceptable |
| EMA/Santoprene | 0.6 | <400 | <10 | Good |

The Santoprene®, Trefsin®, and DVA's (dynamically vulcanized alloys) were formulated with fillers, plasticizers, etc. to have Shore A values of about 65.

The blends of a thermoplastic vulcanizate with an elastic thermoplastic polymer in Table II have the desirable high elongation to break and low amounts of permanent set (elasticity test) of the elastic thermoplastic polymers of Table I but are readily water foamable as shown in the water foaming ability column. The specific gravity data shows the specific gravities are intermediate between those of the foamed thermoplastic vulcanizates and the non-water foamable elastic thermoplastics of Table I. It is believed that the thermoplastic vulcanizates aid in the dispersibility of the water in the blends of thermoplastic vulcanizates and elastic thermoplastic polymers resulting in the water foamability of these compositions. The miscibility and homogeneity of the blends of water with elastic thermoplastic may have hindered foamability of the elastic thermoplastics. It is recognized that these elastic thermoplastics can be chemically foamed but chemical foaming is not as desirable as water foaming due to the need to control the chemical reactions when using chemical foaming agents and the product safety inherent with water foamed compositions. The greater product safety includes a lack of entrapped and/or migratable chemical compositions that may cause allergic or sensitivity problems on contact with human skin.

TABLE III

Physical Properties for Blends of Thermoplastic Vulcanizates with Elastic Thermoplastics and for Elastic Thermoplastics Alone

| | Example A | Example B | Control 1 | Control 2 |
|---|---|---|---|---|
| | 30 wt. % TPV from Butyl Rubber and a Polyolefin (Shore A 65) | 30 wt. % TPV from a Brominated Para-methyl-Styrene-Isobutylene Copolymer in Polypropylene (Shore A 65) | | |
| | 70 wt. % Styrene-Butadiene-Styrene Triblock Copolymer | 70 wt. % Styrene-Butadiene-Styrene Triblock Copolymer | 100 wt. % Styrene-Butadiene-Styrene Triblock Copolymer | 100 wt. % Styrene-Butadiene-Styrene Triblock Copolymer |
| Chemical Foaming Characteristic | Good | Good | Good | Good |
| Foam type | Strip | Strip | Strip | Rod |

TABLE III-continued

Physical Properties for Blends of Thermoplastic Vulcanizates with Elastic Thermoplastics and for Elastic Thermoplastics Alone

| | Example A | Example B | Control 1 | Control 2 |
|---|---|---|---|---|
| | Physical Properties | | | |
| UTS (Ultimate Tensile Strength) (MPa) | 4.90 | 4.30 | 7.37 | 2.09 |
| UE (Ultimate Elongation) % | 896 | 956 | 1050 | 1380 |
| Modulus 100% (MPa) | 0.50 | 0.48 | 0.57 | 0.26 |
| Modulus 200% (MPa) | 0.70 | 0.66 | 0.77 | 0.35 |
| Modulus 300% (MPa) | 0.97 | 0.85 | 0.90 | 0.41 |
| Modulus 400% (MPa) | 1.21 | 1.06 | 1.08 | 0.48 |
| Modulus 500% (MPa) | 1.60 | 1.31 | 1.29 | 0.57 |
| Density (g/cc) | 0.49 | 0.55 | 0.53 | 0.35 |

Table III illustrates that the blends of foamed thermoplastic vulcanizates and elastic thermoplastic polymers show high elongation to break and good ultimate tensile strength. These are comparable to those of chemically foamed elastic thermoplastics. Based on the high elongation to break of the foamed blends of thermoplastic vulcanizate and elastic thermoplastic polymers one could conclude that the heterogeneity of the foamed blend is comparable to the heterogeneity of the foamed elastic thermoplastic.

TABLE IV

Foam from Thermoplastic Vulcanizates and Elastic Thermoplastic Polymers

| | Example C | Example D | Example E |
|---|---|---|---|
| | 25 wt. % TPV from Butylrubber and a Polyolefin (Shore A 65) | 30 wt. % TPV from Butylrubber and a Polyolefin (Shore A 65) | 50 wt. % TPV from Butylrubber and a Polyolefin (Shore A 65) |
| | 75 wt. % Styrene Butadiene Styrene Triblock Copolymer | 70 wt. % Styrene Butadiene Styrene Triblock Copolymer | 50 wt. % Styrene Butadjene Styrene Triblock Copolymer |
| Water Foaming | Good | | Good |
| Chemical Foaming | | Good | |
| | Physical Properties | | |
| UTS (Ultimate Tensile Strength) (MPa) | 2.37 | 1.45 | 2.10 |
| UE (Ultimate Elongation) % | 1190 | 1375 | 832 |
| Modulus 100% (MPA) | 0.25 | 0.22 | 0.34 |
| Modulus 200% (MPa) | 0.36 | 0.32 | 0.52 |
| Modulus 300% (MPa) | 0.47 | 0.41 | 0.72 |
| Modulus 400% (MPa) | 0.59 | 0.49 | 0.96 |

TABLE IV-continued

Foam from Thermoplastic Vulcanizates and
Elastic Thermoplastic Polymers

|  | Example C | Example D | Example E |
|---|---|---|---|
| Modulus 500% (MPa) | 0.74 | 0.58 | 1.21 |
| Density (g/cc) | 0.56 | 0.37 | 0.54 |

Table IV illustrates that a variety of weight ratios of thermoplastic vulcanizate to elastic thermoplastic can be utilized. Table IV also illustrates that water foaming of these blends of thermoplastic vulcanizate and elastic thermoplastic result in similar elongation to break, ultimate tensile strength and modulus to those achieved with chemical foaming. This similarity in physical properties substantiates that water foaming can be effectively used in these compositions.

While in accordance with the patent statutes the best mode and preferred embodiment has been set forth, the scope of the invention is not limited thereto, but rather by the scope of the attached claims.

What is claimed is:

1. An article, comprising a foamed physical blend of at least
    a thermoplastic vulcanizate, and
    an elastic thermoplastic polymer, other than a thermoplastic vulcanizate, comprising either a block copolymer having about 2 or more blocks per polymer of polystyrene or a poly(substituted styrene), wherein the substituted styrene has from about 9 to about 12 carbon atoms per molecule, or a polymer having at least 40 wt. % repeat units from ethylene or combinations thereof, said elastic thermoplastic polymer having a tensile elongation to break of at least 200%, and an elastic recovery of at least 60% in one minute after being elongated to 100% elongation.

2. An article according to claim 1, having a density less than 0.75 grams/cubic centimeter.

3. An article according to claim 2, having an ultimate elongation at break of at least 350% when elongated at 20 inches per minute at 25° C.

4. An article according to claim 3, having an ultimate elongation at break of at least 500% when elongated at 20 inches per minute at 25° C.

5. An article according to claim 3, having at least 90% recovery to its length in the elasticity test when elongated to 150% elongation at 20 inches per minute at 25° C. and then allowed to retract and recover for 1 minute.

6. An article according to claim 4, having at least 90% recovery to its original length in the elasticity test.

7. An article according to claim 5, wherein said elastic thermoplastic polymer comprises a thermoplastic elastomer block copolymer having an average about 2 or more blocks per polymer of polystyrene or a poly(substituted styrene); wherein said substituted styrene has from about 9 to about 12 carbon atoms per repeat unit, and one or more intervening blocks of polyisoprene, hydrogenated polyisoprene, polybutadiene, hydrogenated polybutadiene, butyl rubber, an isobutylene paramethylstyrene copolymer, an ethylene-propylene copolymer, or a styrene-butadiene copolymer, or combinations thereof.

8. An article according to claim 7, wherein the amount of said elastic thermoplastic polymer is at least 35 parts by weight per 100 parts by weight of said thermoplastic vulcanizate and said elastic thermoplastic polymer.

9. An article according to claim 1, wherein the amount of said elastic thermoplastic polymer is at least 25 parts by weight per 100 parts by weight of said thermoplastic vulcanizate and said elastic thermoplastic polymer.

10. An article according to claim 9, wherein said thermoplastic polymer is at least 35 parts by weight per 100 parts by weight of said thermoplastic vulcanizate and said elastic thermoplastic polymer.

11. An article according to claim 7, wherein said foamed article was foamed using a volatile material consisting essentially of water.

12. A process for forming a foamed article from a blend of at least a thermoplastic vulcanizate and an elastic thermoplastic polymer, said process comprising:
    blending at least one thermoplastic vulcanizate and at least one elastic thermoplastic polymer, other than a thermoplastic vulcanizate, comprising either a block copolymer having about 2 or more blocks per polymer of polystyrene or a poly(substituted styrene), wherein the substituted styrene has from about 9 to about 12 carbon atoms per molecule, or a polymer having at least 40 wt. % repeat units from ethylene or combinations thereof, said elastic thermoplastic polymer having a tensile elongation to break of at least 200% and a recovery in the elasticity test of at least 60%, and
    foaming said blend with a chemical or mechanical foaming agent so that said blend has a density of less than 0.75 g/cc.

13. A process of claim 12, wherein said thermoplastic polymer is at least 25 parts by weight per 100 parts by weight of said blend of thermoplastic vulcanizate and thermoplastic polymer.

14. A process of claim 12, wherein said foaming is a result of volatilization of a blowing agent consisting essentially of water.

15. A process of claim 13, wherein said foaming is a result of volatilization of a blowing agent consisting essentially of water.

16. A process of claim 15, wherein said elastic thermoplastic polymer is at least 35 parts by weight.

17. A process of claim 12, wherein said elastic thermoplastic polymer comprises a polymer having at least 40 wt. % repeat units from ethylene, and wherein said polymer does not have blocks of vinyl aromatic repeat units sufficient to act as physical crosslinks during elongation.

18. A process of claim 14, wherein said elastic thermoplastic polymer comprises a polymer having at least 40 wt. % repeat units from ethylene, and wherein said polymer does not have blocks of vinyl aromatic repeat units sufficient to act as physical crosslinks during elongation.

* * * * *